US005714680A

United States Patent [19]
Taylor et al.

[11] Patent Number: 5,714,680
[45] Date of Patent: Feb. 3, 1998

[54] METHOD AND APPARATUS FOR MEASURING PRESSURE WITH FIBER OPTICS

[75] Inventors: Henry F. Taylor; Robert A. Atkins; Chung-Eun Lee; James H. Gardner, all of College Station; William N. Gibler; Matthew O. Spears, both of Bryan; James J. McCoy, Spring; Mark D. Oakland; Victor P. Swenson, both of Bryan, all of Tex.

[73] Assignee: The Texas A&M University System, College Station, Tex.

[21] Appl. No.: 147,029

[22] Filed: Nov. 4, 1993

[51] Int. Cl.⁶ .................. G01B 9/02; G02B 6/26; G01L 7/08
[52] U.S. Cl. ............. 73/37; 73/705; 73/35.12; 73/115; 356/352; 356/345; 385/12
[58] Field of Search ................. 73/37, 705, 715, 73/35.12, 115; 356/352, 345, 355; 385/12, 13

[56] References Cited

U.S. PATENT DOCUMENTS

| | | | |
|---|---|---|---|
| 4,119,363 | 10/1978 | Camlibel et al. | 350/96.2 |
| 4,345,816 | 8/1982 | Nakai et al. | 350/96.2 |
| 4,408,123 | 10/1983 | Sichling et al. | 250/226 |
| 4,613,752 | 9/1986 | Davis | 250/227 |
| 4,653,846 | 3/1987 | Yamazaki et al. | 350/96.2 |
| 4,657,346 | 4/1987 | Berry et al. | 350/320 |
| 4,659,923 | 4/1987 | Hicks, Jr. | 250/227 |
| 4,753,109 | 6/1988 | Zabler | 73/115 |
| 4,848,999 | 7/1989 | Taylor | 65/4.3 |
| 4,873,989 | 10/1989 | Einzig | 128/692 |
| 4,891,640 | 1/1990 | Ip | 340/853 |
| 4,904,046 | 2/1990 | Paschke et al. | 350/96.2 |
| 4,948,406 | 8/1990 | Kornmann | 68/3.11 |
| 5,091,987 | 2/1992 | MacCulloch et al. | 385/66 |

(List continued on next page.)

OTHER PUBLICATIONS

C. E. Lee, et al., "Metal–Embedded Fiber Optic Fabry–Perot Sensors," 1991 *Optical Society of America*, Dec. 15, 1991, vol. 16, No. 24., pp. 1990–1992, reprint from *Optics Letters*.

C. E. Lee, et al., "Interferometric Optical Fibre Sensors Using Internal Mirrors," *Department of Electrical Engineering, Texas A&M University*, Oct. 12, 1987.

C. E. Lee, et al., "Performance of a Fiber–Optic Temperature Sensor from –200° to 1050° C," *Optics Letters*, vol. 13, No. 11, Nov., 1988, pp. 1038–1040.

Jorge J. Alcoz, et al., "Embedded Fiber–Optic Fabry–Perot Ultrasound Sensor," *IEEE Transactions on Ultrasonics, Ferroelectrics, and Frequency Control*, vol. 37, No. 4, Jul., 1990, pp. 302–306.

(List continued on next page.)

*Primary Examiner*—Hezron E. Williams
*Assistant Examiner*—J. David Wiggins
*Attorney, Agent, or Firm*—Baker & Botts, L.L.P.

[57] ABSTRACT

A method and apparatus are provided for measuring pressure in a combustion chamber of an internal combustion engine is provided with a non-intrusive, metal-embedded fiber optic pressure sensor. A Fabry-Perot Interferometer is arranged in a terminated, single mode fiber to function as a pressure gauge. The fiber Fabry-Perot Interferometer (FFPI) is embedded in a metal part which is disposed in the cylinder head of the engine. The metal part and FFPI experience a longitudinal compression in response to the pressure in the chamber. In another aspect of the invention, a non-intrusive fiber containing the FFPI is embedded in a hole drilled or otherwise provided in the metal housing of a spark plug. The spark plug is threaded into the cylinder head of an internal combustion engine and is directly exposed to the combustion chamber pressure. Consequently, the spark plug housing and FFPI experience a longitudinal strain in response to the pressure in the chamber.

14 Claims, 4 Drawing Sheets

U.S. PATENT DOCUMENTS

| | | | |
|---|---|---|---|
| 5,127,083 | 6/1992 | Ikeda et al. | 385/138 |
| 5,194,847 | 3/1993 | Taylor et al. | 340/557 |
| 5,283,852 | 2/1994 | Gibler et al. | 385/136 |
| 5,390,546 | 2/1995 | Wlodarczyk | 73/715 |
| 5,421,195 | 6/1995 | Wlodarczyk | 73/115 |
| 5,446,279 | 8/1995 | Hsu | 250/227.21 |
| 5,452,087 | 9/1995 | Taylor et al. | 356/352 |

OTHER PUBLICATIONS

C. E. Lee, et al., "Metal–Embedded Fiber–Optic Fabry–Perot Sensors," *Optics Letters*, vol. 16, No. 24, Dec. 15, 1991, pp. 1990–1992.

Chung E. Lee, et al., "In–Line Fiber Fabry–Perot Interferometer with High–Reflectance Internal Mirrors," *Journal of Lightwave Technology*, vol. 10, No. 10, Oct., 1992, pp. 1376–1379.

METHOD AND APPARATUS FOR MEASURING PRESSURE WITH FIBER OPTICS

CROSS REFERENCE TO RELATED APPLICATION

This Application is related by subject matter to commonly assigned, copending U.S. patent application Ser. No. 08/147,830, now U.S. Pat. No. 5,452,087, which is incorporated herein by reference.

TECHNICAL FIELD OF THE INVENTION

This invention relates in general to the field of fiber optics. More particularly, the present invention relates to a method and apparatus for measuring the pressure inside a combustion chamber of an internal combustion engine using a fiber optic sensor.

BACKGROUND OF THE INVENTION

Ever since the introduction of fiber optics technology, the optical fiber has proven to be a versatile and relatively efficient means of transporting light energy and information. For example, optical fibers are used in the medical field to transport laser energy through flexible catheters for pinpoint microsurgery, or in the telecommunications field to transport data for long distances at very high rates. More recently, developments in fiber optics technology have spurred considerable research on the use of optical fibers as pressure or strain sensors.

The need for improved pressure sensors has been widely recognized in the research and development community. For example, spring-activated pressure gauges have been used in the automotive industry to measure dynamic pressures in automobile and truck engines. In one application, a port in a cylinder wall or head of an engine is provided for pressure measurements. Gas exiting the combustion chamber through the port passes through a metal tube to the spring-activated gauge. However, spring-activated pressure sensing devices do not operate reliably at high temperatures. Consequently, the device must be located remotely from the combustion chamber, which reduces the response time of the sensor and introduces measurement errors due to acoustical effects and pressure drops in the elongated tube. The relatively slow response of such sensors limits their utility to average pressure measurements, and the resulting measurement errors reduce the accuracy and reliability of the measurement data.

More accurate pressure readings, with acceptable time resolutions, have been provided by using piezoelectric transducers as sensors. In a conventional application, a piezoelectric transducer is mounted in a special port, typically in the cylinder head of an engine. Two types of such transducers may be used. In one type, the piezoelectric element is exposed directly to the pressure in the combustion chamber. In the other type of transducer, a piston is located between the chamber and the piezoelectric element. Consequently, the element responds to the displacement of the piston and only indirectly to the pressure in the chamber. A disadvantage of piezoelectric transducers is that they must be cooled with recirculating water or air because of their vulnerability to the high temperature environment in which they must operate. Nevertheless, even with optimum cooling, piezoelectric transducers must be frequently recalibrated, their operating life is relatively short, and the sensors are relatively expensive. Generally, piezoelectric pressure sensors have proven useful for engine research and development, but due to their limitations, they have not been widely incorporated into engine products.

Recent advances in embedding optical fibers in metals have spurred the development of fiber optic pressure sensors. For example, commonly-assigned U.S. Patent Application Serial No. (Attorney Docket No. 17575-0135) describes a novel technique for embedding optical fibers in metals, by using stress-relieving tubes at the air-metal interfaces of the fibers. Previous attempts to embed optical fibers in metals had all resulted in failure. Even more particularly, however, Vol. 16, No. 24 of *Optics Letters*, Dec. 15, 1991, pp. 1990–92, describes the sensing of temperature and ultrasonic pressure with fiber optic Fabry-Perot interferometers embedded in aluminum parts. Breakage of the fibers at the air-metal interface during the embedding process is avoided through the use of stainless-steel stress-relief tubes. However, these fibers are fed completely through the aluminum part, which may be useful for monitoring temperature and strain in aluminum structures such as aircraft wings, but prohibitive in applications where the sensor must not be intrusive, such as, for example, monitoring pressure inside the combustion chamber of an engine. Therefore, it follows that if a non-intrusive, metal-embedded fiber optic pressure sensor were possible, then the problems encountered with spring-activated gauges and piezoelectric pressure sensors would be overcome.

SUMMARY OF THE INVENTION

In accordance with the present invention, a method and apparatus are provided for measuring pressure differences across a mechanical barrier with fiber optics which substantially eliminate or reduce disadvantages and problems associated with prior methods and apparatuses.

In one aspect of the present invention, a method and apparatus for measuring pressure in a combustion chamber of an internal combustion engine is provided with a non-intrusive, metal-embedded fiber optic pressure sensor. A Fabry-Perot Interferometer is arranged in a terminated, single mode fiber to function as a pressure gauge. The fiber Fabry-Perot Interferometer (FFPI) is embedded in a metal casing which is disposed in a cylinder head of the engine. The metal casing and FFPI experience a longitudinal compression in response to the pressure in the chamber. In an aspect of the invention, the metal casing and the FFPI experience the pressure indirectly through a metal diaphragm.

In another aspect of the invention, a non-intrusive fiber containing the FFPI is embedded in a hole drilled or otherwise provided in the metal housing of a spark plug. The spark plug is threaded into the cylinder head of an engine and is directly exposed to the combustion chamber pressure. Consequently, the spark plug and FFPI experience a longitudinal strain in response to the pressure in the chamber.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The preferred embodiments of the present invention and their advantages are best understood by referring to FIGS. 1 through 5 of the drawings, like numerals being used for like and corresponding parts of the various drawings.

Figure 1:
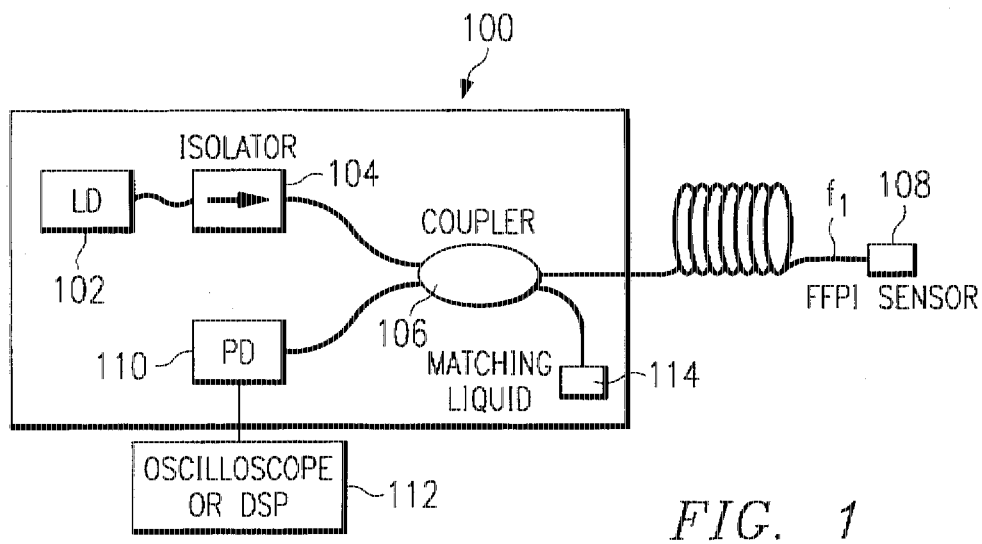
FIG. 1 is a simplified schematic of a pressure monitoring system using a non-intrusive, embedded fiber optic pressure sensor constructed in accordance with the present invention.

With reference to the drawings, FIG. 1 shows a simplified schematic of a pressure monitoring system using a non-intrusive, embedded fiber optic pressure sensor constructed in accordance with the invention. Pressure monitoring system 100 includes single mode laser source 102, which may be a semiconductor laser diode, a solid state laser such as a neodymium yttrium aluminum garnet (ND:YAG) laser, or other lasers that produce a suitably narrow spectral line. In a preferred embodiment, laser source 102 is a continuously operating, 1.3 μm semiconductor laser diode with a laser heat sink. The temperature of the laser heat sink may be controlled with a thermoelectric cooler and monitored with a thermistor. The light from laser source 102 is coupled into single mode optical fiber f1, which is generally depicted by the solid line connected between the components of system 100. The coherent light from laser source 102 is passed through optical isolator 104, which functions to prevent destabilization of the laser's spectral purity due to optical feedback from the rest of the system. The light from optical isolator 104 is split into two equal-amplitude components in fiber coupler 106. One component of the light is coupled to embedded FFPI 108, while the second component is terminated in impedance matching liquid device 114. Responsive to a sensed pressure, a portion of the first component of light is reflected from embedded FFPI 108 and passed through fiber coupler 106 to photosensitive detector 110. Photosensitive detector 110 may be, for example, an InGaAs semiconductor photodiode or any suitable detector having similar functional capabilities as detector 110. Photosensitive detector 110 converts the detected light energy into an electrical signal which is displayed on oscilloscope or digital signal processor 112.

Figure 2:
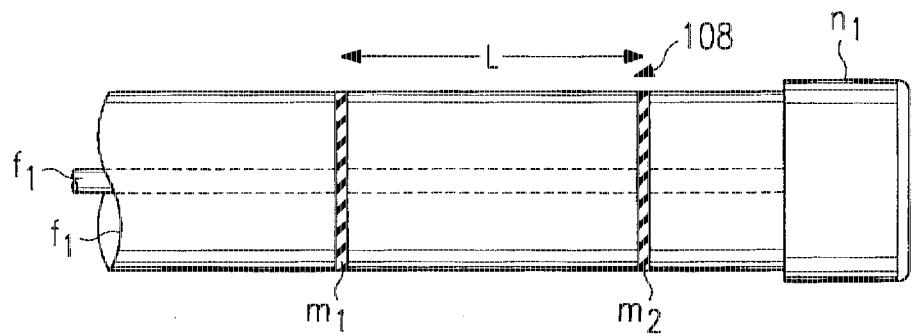
FIG. 2 is a side view of a fiber Fabry-Perot Interferometer in accordance with a preferred embodiment of the present invention.

FIG. 2 is a side view of a fiber Fabry-Perot Interferometer in accordance with a preferred embodiment of the present invention. The pressure to be displayed or otherwise recorded is provided by the optical signal from the FFPI, which may function as a highly sensitive strain or pressure transducer. FFPI 108 comprises internal mirrors m1 and m2 separated by length L of fiber f1. Each mirror m1 and m2 is produced by a known process of vacuum depositing a thin film of dielectric material $TiO_2$ on a cleaved end of fiber f1. Fiber f1 consists of a fiber core combined with a cladding of lower refractive index to form an optical waveguide. Although the fiber core in FIG. 2 is depicted as being surrounded by cladding, it is for illustrative purposes only, and the core and cladding materials are typically combined to form a single, mechanical entity. In one aspect of the invention, nonreflective termination n1 is provided to minimize back-reflections and thus terminate the transmitted signal. The end of fiber f1 may be terminated by cleaving or polishing the fiber at a predetermined angle selected specifically to minimize back-reflections, or by breaking the fiber in such a manner that the surface is a poor reflector. A novel fusion splicing technique, which is described in U.S. Pat. No. 4,848,999, and incorporated herein by reference, is used to incorporate mirrors m1 and m2 into a continuous length of the fiber. The reflectance R for each of mirrors m1 and m2 is selected to fall within the 2–12% range.

The reflectance of the FFPI is a function of the optical path length nL of the interferometer, where n is the effective refractive index of the guided mode of the fiber. Consequently, a longitudinal strain or compression (i.e., change in L) affects the fraction of the incident optical power which is reflected by the FFPI. By measuring this reflected optical power at display 112, the magnitude or value of the strain or compression may be determined. Only changes that affect the fiber in the region between mirrors m1 and m2 are sensed. Assuming that the induced change of nL in FFPI 108 is proportional to the pressure P in the combustion chamber of an engine, then the round trip phase shift of the reflected signal φ is given by:

$$\phi = \phi_0 + KP \qquad (1)$$

where $\phi_0$ is the round trip phase shift of the reflected signal at zero pressure, and K is a constant that is determined by the sensor's configuration. By measuring this phase shift, the magnitude of the longitudinal strain (change in L) experienced by the sensor and, therefore, the pressure in the combustion chamber may be determined.

Figure 3:
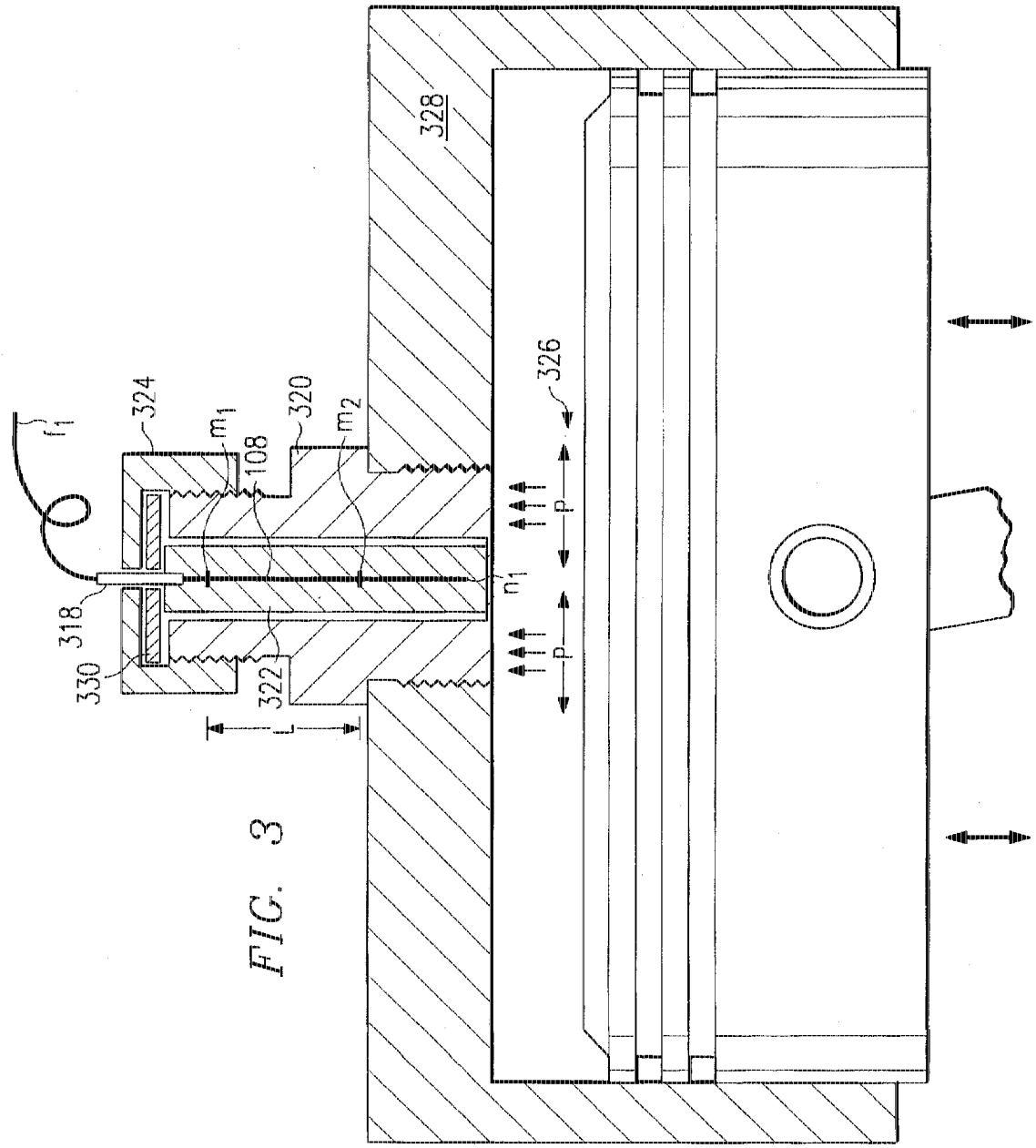
FIG. 3 is a cross-sectional view of a non-intrusive, embedded fiber optic pressure sensor disposed in a cylinder head of an internal combustion engine in accordance with the preferred embodiment of the present invention.

FIG. 3 is a cross-sectional view of a non-intrusive, embedded fiber optic pressure sensor disposed in a cylinder head of an internal combustion engine in accordance with the preferred embodiment of the present invention. Using a form of the embedding technique described in U.S. patent application Ser. No. 07/926,756, now U.S. Pat. No. 5,283,852, which is incorporated herein by reference, FFPI 108 is embedded along the axis of metal part 322. Metal part 322 may be, for example, a metal rod or other appropriate part that has been machined or otherwise constructed so that it can be disposed in a larger structure, such as, for example, a metal housing. Metal part 322 is disposed in metal housing 320, which may be constructed of stainless steel or any other suitable metal. Fiber f1 including FFPI 108 is passed through stress-relieving tube 318, which is positioned at the top opening in metal part 322. Tube 318 may be constructed of metals, such as stainless steel, or ceramic or other suitable materials, and functions to prevent breakage of the fiber during the embedding process and also provide strain relief in the finished part. The size of the opening in metal part 322 is such that it permits stress-relieving tube 318 to be inserted therethrough, but to leave a minimal gap between the top opening and the outer surface of tube 318 so that molten metal cannot escape therethrough. In addition, the inside diameter of tube 318 is such that it accommodates optical fiber f1 and FFPI 108 and yet minimizes the entry of molten metal. In a preferred embodiment, the metal part containing the embedded FFPI may be produced by a casting process in which molten aluminum alloy 356 (92.7% Al, 7.0% Si, 0.3% Mg) is poured into a mold into which the FFPI extends. Aluminum, other aluminum alloys, alloys of brass or other metals, or other suitable materials such as, for example, ceramics, may be substituted for aluminum alloy 356. The only constraint for the purpose of embedding optical fibers is the melting temperature of the metal or other material used. The melting point of the molten material to be poured should be less than that of fiber f1, which is approximately 1600° C. for glass fibers and over 2000° C. for sapphire fibers. The molten material is allowed to cool to or near room temperature before moving the resultant embedded sensor. If necessary, the metal part containing the FFPI may be machined to desired specifications. Alternatively, embedding may be accomplished by drilling a hole in a metal part and epoxying the FFPI in the hole. However, it is preferable to cast the FFPI in the metal part for higher operating temperatures.

Housing 320 is machined and threaded at both ends, so that one end can be screwed into a corresponding threaded hole in cylinder head 328, and compression nut 324 can be screwed onto the opposite end. Metal part 322 is disposed inside a hole drilled, machined, or otherwise fashioned along the axis of housing 320. Compression nut 324 is screwed down against washer 330, which functions to fix the position of metal part 322 with respect to housing 320. Washer 330 may be made of any appropriate washer material capable of withstanding the high temperatures and harsh environment. An end of metal part 322 is disposed against an inside end of housing 320. The adjacent outside end of housing 320 is directly exposed to the pressurized environment inside combustion chamber 326. It would be within the scope of the invention for the pressurized environment to contain a gas or liquid. Importantly, neither metal part 322, housing 320, nor the embedded fiber sensor intrude extensively into the combustion chamber. Pressure in the chamber forces the end of housing 320 against the adjacent end of metal part 322, resulting in a longitudinal compression in metal part 322, which is also experienced by the embedded fiber sensor. The resulting change (decrease) in length L of the section of fiber between mirrors m1 and m2 produces a proportional change in the reflected energy from FFPI 108. Constructed in this manner, optical signals from laser source 102 are coupled via fiber f1 to FFPI 108, and the signals reflected by FFPI 108 are received and analyzed at display 112. Signals passing through FFPI 108 are terminated by termination n1.

Figure 4:
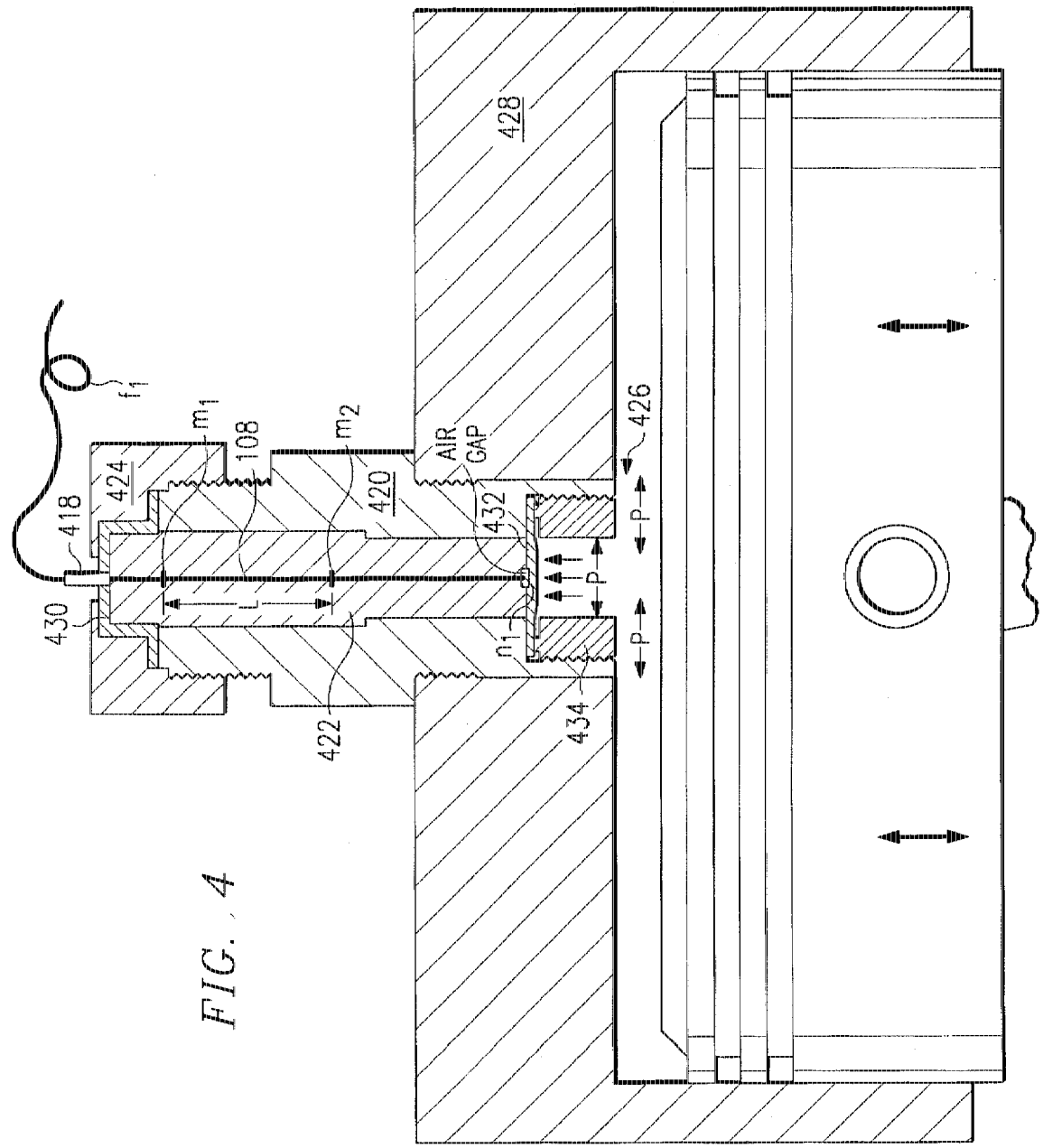
FIG. 4 is a cross-sectional view of a non-intrusive, embedded fiber optic pressure sensor disposed in a cylinder head of an internal combustion engine in accordance with a second embodiment of the present invention.

FIG. 4 is a cross-sectional view of a non-intrusive, embedded fiber optic pressure sensor disposed in a cylinder head of an internal combustion engine in accordance with a second embodiment of the present invention. As an alternative to the embodiment shown in FIG. 3, the metal part containing FFPI 108 may be mounted in such a way that the pressure in the combustion chamber may be experienced through a metal diaphragm, which is physically distinct from the metal housing. Using the embedding technique described above, FFPI 108 is embedded along the axis of metal part 422. Metal part 422 may be made of a material similar to that of metal part 322 in FIG. 3, and machined or otherwise constructed so that it can be disposed in metal housing 420. Metal housing 420 may be constructed of stainless steel or any other suitable metal. Fiber f1 including FFPI 108 is passed through stress-relieving tube 418, which is positioned at the top opening in metal part 422. Similar to tube 318 in FIG. 3, tube 418 may be constructed of stainless steel, or ceramic or other suitable materials. Similar to metal part 322 in FIG. 3, metal part 422 may be cast from an aluminum alloy or other suitable material. If necessary, metal part 422 containing the FFPI may be machined to desired specifications. Alternatively, embedding may be accomplished by drilling a hole in a metal part and epoxying the FFPI in the hole. The epoxy is capable of withstanding relatively high temperatures.

Housing 420 is machined and threaded at three locations, including the outer diameter of one end of the housing, the outer diameter at an intermediate point on the housing, and the inner diameter at the opposite end of the housing. Consequently, the intermediate threads can then be screwed into a corresponding threaded hole in cylinder head 428, and compression nut 424 can be screwed onto the end of the housing over the outer diameter threads. Threaded collar 434 is screwed down against metal diaphragm 432, which functions to fix the bottom end of metal housing 420 in place against metal diaphragm 432. Diaphragm 432 may be constructed of type 304 stainless steel, or any other suitable material capable of withstanding the high temperature and pressure environment in combustion chamber 426. Ferrule 430 may be made of stainless steel or any other suitable material. A hole is drilled or otherwise fashioned in the bottom end of metal part 422, which defines an air gap. Therefore, termination n1 of FFPI 108 is disposed adjacent to the air gap. Compression nut 424 is screwed down against metal ferrule 430, which functions to fix the position of metal part 422 with respect to housing 420 and diaphragm 432. The bottom end of metal part 422 is disposed against an inside surface of diaphragm 432, except for the area defining the air gap. The adjacent outside surface of diaphragm 432 is directly exposed to the pressurized environment inside combustion chamber 426. Pressure in the chamber produces a proportional pressure against the bottom surface of diaphragm 432, forcing it against the bottom surface of metal part 422, and thus producing a longitudinal compression in FFPI 108. The resulting change (decrease) in the length L produces a proportional change in the reflected energy from FFPI 108. Similar to the preferred embodiment described earlier, optical signals from laser source 102 are coupled via fiber f1 to FFPI 108, and the signals reflected by FFPI 108 are received and analyzed at display 112. Signals passing through FFPI 108 are terminated by termination n1. Alternatively, it would be within the scope of the invention to remove diaphragm 432 so that the metal part and embedded FFPI are directly exposed to the pressure in the combustion chamber.

Figure 5:
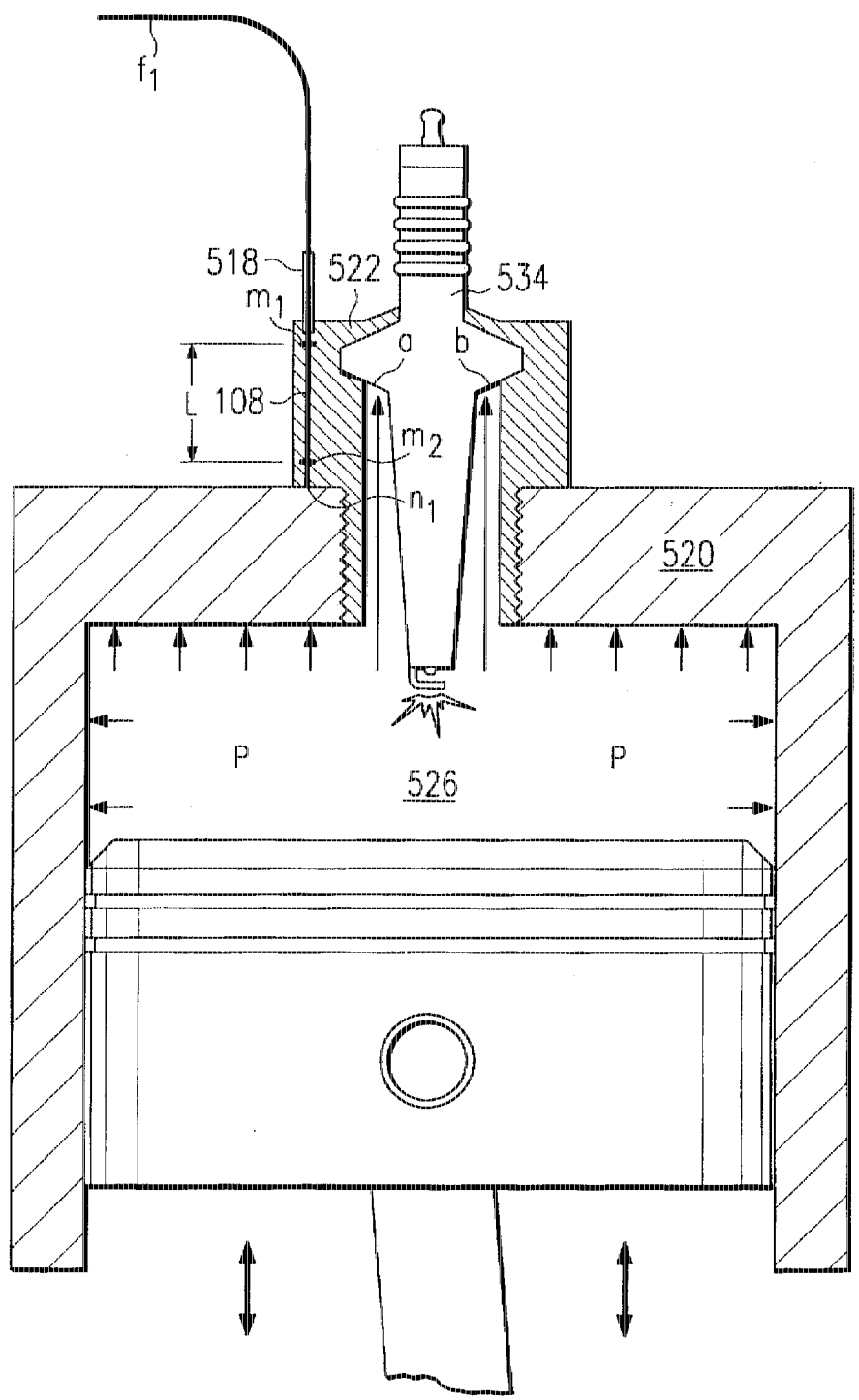
FIG. 5 is a cross-sectional view of a non-intrusive, embedded fiber optic pressure sensor disposed alongside a spark plug of an internal combustion engine in accordance with a third embodiment of the present invention.

FIG. 5 is a cross-sectional view of a non-intrusive, embedded fiber optic pressure sensor disposed alongside a spark plug of an internal combustion engine in accordance with a third embodiment of the present invention. Using the embedding technique described above, FFPI 108 is passed through strain-relief tube 518, and embedded in metal housing 522 of spark plug 534. FFPI 108 may be embedded parallel to the rotational axis of spark plug 534, in a hole drilled or a groove machined in metal housing 522. Spark plug 534 may be a standard spark plug that is typically used in an internal combustion engine. FFPI 108 is then fixed in place with a high temperature solder, epoxy, or other suitable material.

Spark plug housing 522, which includes embedded FFPI 108, is screwed into a corresponding threaded hole in cylinder head 520. Therefore, spark plug surfaces 534a and 534b are directly exposed to the pressure P in combustion chamber 526. Consequently, the upper portion of spark plug 534 is caused to stretch and experience a longitudinal strain that increases the length L in response to pressure P. The resulting increase in length L produces a proportional change in the reflected energy from FFPI 108. The reflected energy from FFPI 108 is then received and analyzed at display 112 of FIG. 1. Alternatively, it would be within the scope of the present invention to attach FFPI 108 to the outside surface of housing 522 with solder or epoxy, rather than embedding it within the housing.

In summary, the signal response to pressure of a conventional piezoelectric pressure sensor is similar to the signal response of the fiber optic pressure sensor of the invention. However, the conventional sensor must be water-cooled or air-cooled to obtain such a response at high temperatures, thus increasing the complexity and cost of the conventional sensors compared with sensors constructed in accordance with the invention. In fact, fiber optic sensors constructed in accordance with the invention may operate continuously at temperatures above 1000° C., while the maximum allowable temperature for operating uncooled, piezoelectric pressure sensors is in the range of 150° C.–250° C.

Although the present invention has been described in detail, it should be understood that various changes, substitutions and alterations can be made thereto without departing from the spirit and scope of the present invention as defined by the appended claims.

The invention claimed is:

1. Apparatus for measuring pressure in a vessel containing a gas or liquid, comprising:
    a metal part;
    a fiber optic sensor embedded in said metal part wherein one end of said fiber optic sensor terminates in said metal part; and
    a metal housing that penetrates through an aperture in a wall of said vessel and experiences the pressure in said vessel, said metal part abutting a surface of said metal housing and experiencing a compression responsive to said pressure experienced by said metal housing, said fiber optic sensor operable to experience a compression responsive to the pressure on said metal housing.

2. The apparatus of claim 1, wherein said fiber optic sensor includes a Fabry-Perot Interferometer.

3. The apparatus of claim 1, wherein said vessel comprises a combustion chamber of a cylinder in an internal combustion engine.

4. The apparatus of claim 1, wherein said aperture comprises an internally threaded hole, said metal housing including matching external threads, and said penetration being accomplished by screwing said metal housing into said hole.

5. Apparatus for measuring pressure in a vessel containing a gas or liquid, comprising:
    a metal part;
    a fiber optic sensor embedded in said metal part wherein one end of said fiber optic sensor terminates in said metal part; and
    a diaphragm member penetrating through an aperture in a wall of said vessel and experiencing the pressure within said vessel, said metal part positioned in contact with said diaphragm member and experiencing a compression responsive to said pressure experienced by said diaphragm member, said fiber optic sensor operable to experience a compression responsive to the pressure on said diaphragm member.

6. The apparatus of claim 5, wherein said fiber optic sensor includes a Fabry-Perot Interferometer.

7. The apparatus of claim 5, wherein said vessel comprises a combustion chamber of a cylinder in an internal combustion engine.

8. The apparatus of claim 5, wherein said aperture comprises an internally threaded hole, said diaphragm member including matching external threads, and said penetrating being accomplished by screwing said diaphragm member into said hole.

9. Apparatus for measuring pressure in a combustion chamber of an internal combustion engine, comprising:
    a spark plug threadedly attached to a cylinder head of said internal combustion engine, a portion of said spark plug disposed in said combustion chamber; and
    a fiber optic sensor embedded in said spark plug and operable to experience a strain responsive to a pressure on said spark plug.

10. A method of measuring pressure in a vessel containing a gas or liquid, comprising the steps of:
    embedding a fiber optic sensor in a metal part;
    inserting a metal housing through an aperture in a wall of said vessel;
    positioning a first end of said metal part in contact with said metal housing;
    sensing a compression in said fiber optic sensor responsive to a pressure in said vessel; and
    generating an optical signal responsive to said compression.

11. The method of claim 10, wherein the embedding and sensing steps further comprise the steps of:
    embedding a fiber Fabry-Perot Interferometer in said metal part; and
    sensing a compression in said fiber Fabry-Perot Interferometer responsive to a pressure in said vessel.

12. A method of measuring pressure in a vessel containing a gas or liquid, comprising the steps of:
    embedding a fiber optic sensor in a metal part;
    inserting a diaphragm member through an aperture in a wall of said vessel;
    positioning a first end of said metal part in contact with said diaphragm member;
    sensing a compression in said fiber optic sensor responsive to a pressure on said diaphragm member; and
    generating an optical signal responsive to said compression.

13. The method of claim 12, wherein the embedding and sensing steps further comprise the steps of:
    embedding a fiber Fabry-Perot Interferometer in said metal part; and
    sensing a compression in said fiber Fabry-Perot Interferometer responsive to a pressure on said diaphragm member.

14. A method of measuring pressure in a combustion chamber of an internal combustion engine, comprising the steps of:
    embedding a fiber optic sensor in a spark plug of said internal combustion engine;
    sensing a strain in said fiber optic sensor responsive to a pressure in said combustion chamber; and
    generating an optical signal responsive to said strain.

* * * * *